US012656791B2

(12) United States Patent
Panaccio et al.

(10) Patent No.: US 12,656,791 B2
(45) Date of Patent: Jun. 16, 2026

(54) DEVICE COMPRISING A FLOATING PLATE AND EXTENDABLE PIPE FOR CONTROLLED DISCHARGE OF LIQUID

(71) Applicant: PREMIER TECH EAU ET ENVIRONNEMENT LTÉE, Rivière-du-Loup (CA)

(72) Inventors: Béatrice Panaccio, St-André-de-Kamouraska (CA); Colin Côté, Rivière-du-Loup (CA); Jean-Pierre Daigle, Rivière-du-Loup (CA); Samuel Lavoie, Rivière-du-Loup (CA); Antonin Paquet, Sherbrooke (CA); Yan Gilbert, Rivière-du-Loup (CA)

(73) Assignee: PREMIER TECH EAU ET ENVIRONNEMENT LTEE, Rivière-du-Loup (CA)

( * ) Notice: Subject to any disclaimer, the term of this patent is extended or adjusted under 35 U.S.C. 154(b) by 0 days.

(21) Appl. No.: 19/152,444

(22) PCT Filed: Nov. 7, 2023

(86) PCT No.: PCT/CA2023/051482
§ 371 (c)(1),
(2) Date: Jul. 31, 2025

(87) PCT Pub. No.: WO2024/174018
PCT Pub. Date: Aug. 29, 2024

(65) Prior Publication Data
US 2026/0111046 A1 Apr. 23, 2026

Related U.S. Application Data

(60) Provisional application No. 63/447,343, filed on Feb. 21, 2023.

(51) Int. Cl.
G05D 7/01 (2006.01)
C02F 1/00 (2023.01)
G05D 9/02 (2006.01)

(52) U.S. Cl.
CPC ........... *G05D 7/0166* (2013.01); *C02F 1/006* (2013.01); *G05D 9/02* (2013.01)

(58) Field of Classification Search
CPC .......... G05D 7/0166; G05D 9/02; C02F 1/006
See application file for complete search history.

(56) References Cited

U.S. PATENT DOCUMENTS 3,311,129 A * 3/1967 Binder .................... E03C 1/244
                                                         137/578
7,125,200 B1 * 10/2006 Fulton .................. B01D 35/027
                                                          405/96

FOREIGN PATENT DOCUMENTS

CN       109368714 A      2/2019
DE         653512 C      11/1937
              (Continued)

OTHER PUBLICATIONS

EP0834341A2 machine translation (Year: 2003).*
              (Continued)

*Primary Examiner* — Michael R Reid
(74) *Attorney, Agent, or Firm* — SMART & BIGGAR LP

(57) ABSTRACT

The present application relates to liquid distribution system. More specifically, the present application relates to a device for controlled discharge of liquid, comprising: an extendable pipe having a bottom end and a top end being extendable from a collapsed position to an extended position; a floating plate connected to the top end of the pipe and having an opening in fluid communication with the pipe and the bottom end for receiving and for discharging said liquid, the floating plate being configured to float on the surface of the liquid, and the extendable pipe is configured to extend to the
              (Continued)

extended position when an increasing level of liquid forces the plate to rise up until the extended position is reached; wherein at said extended position, the floating plate is configured to fill with liquid and collapse to reach the collapsed position whereat the liquid flows inside the pipe and through the bottom end for discharging the liquid.

20 Claims, 4 Drawing Sheets

(56) References Cited

FOREIGN PATENT DOCUMENTS

| | | | |
|---|---|---|---|
| DE | 2657488 | A1 | 6/1978 |
| DE | 4212708 | A1 | 10/1993 |
| DE | 19804160 | A1 | 9/1999 |
| EP | 0834341 | B1 | 6/2003 |

OTHER PUBLICATIONS

English Abstract and Claims of EP0834341B1, "Device for collecting a layer of light liquid", published on Jun. 4, 2003.
English Translation—Machine Translation of CN109368714A1, "Water treatment chemical maintenance-free dosing system", published on Feb. 22, 2019.
English Abstract of DE2657488A1, "Water extraction equipment for reservoir—has overflow pipe supported by float and guided on stand-pipe", published on Jun. 22, 1978.

* cited by examiner 1      2      3      4      5

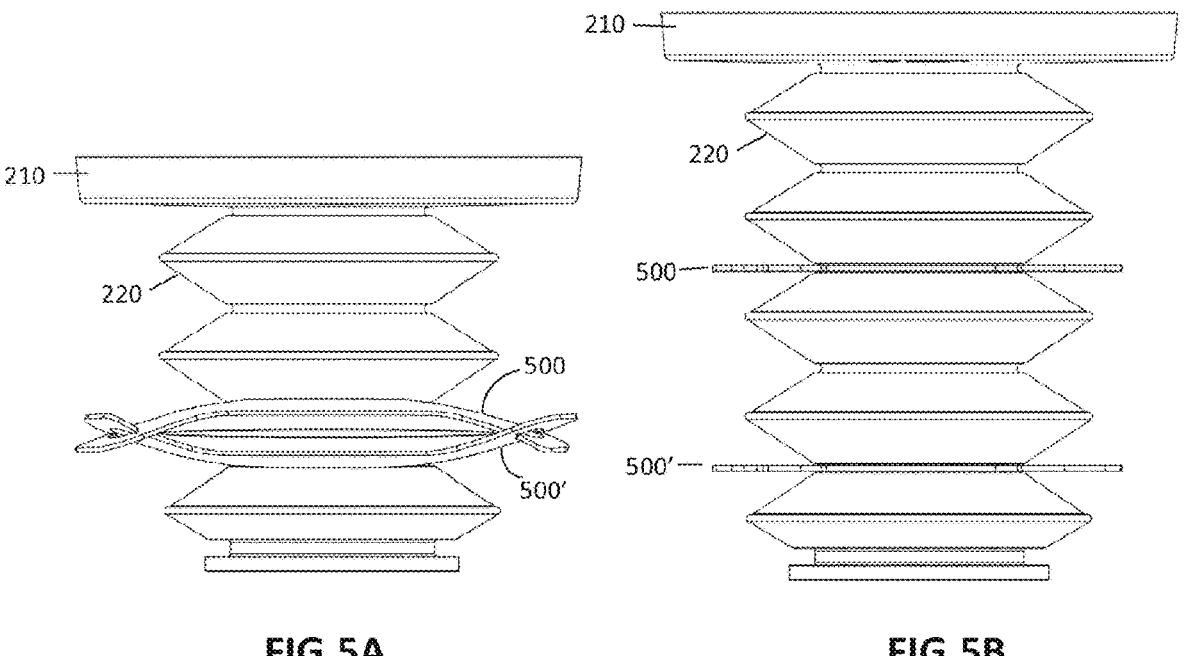
FIG.5A                    FIG.5B

DEVICE COMPRISING A FLOATING PLATE AND EXTENDABLE PIPE FOR CONTROLLED DISCHARGE OF LIQUID

CROSS-REFERENCE TO RELATED APPLICATION

The present application is a 35 USC 371 national stage entry of PCT/CA2023/051482 filed on Nov. 7, 2023, and which claims the benefit of priority of U.S. Provisional Patent Application No. 63/447,343 filed on Feb. 21, 2023. These documents are hereby incorporated herein by reference in their entirety.

FIELD

The present application is in the field of liquid distribution system. More specifically, the present application relates to a device for controlled discharge of liquid.

BACKGROUND

The quality of liquid distribution on the surface of a filter bed is one of the key parameters for the proper functioning of a biofilter. There are several ways to optimize this distribution of water, but in all cases it is based on the discharge of a given volume of water, at a controlled rate, towards a distribution device. For example, known systems include a pump located in a reservoir, where water accumulates, and whose activity is triggered when a control float is activated when the water reaches a threshold level. The stroke of this control float and the surface area of the reservoir will determine the volume that will be transferred to the filter bed, while pump specifications and installation conditions will dictate the flow rate applied to the distribution device. The rapid loading of a device composed of a set of perforated channels can optimize this distribution over the surface of the filter bed. The system of perforated channeled-plates and tipping bucket of the Ecoflo™ biofilter is an example of a gravity mechanism for dosing and distributing the water to be treated onto a filter surface. The first, using a pump, has the advantage of applying a dose in a powerful way, and therefore of maximizing the rapid loading of the distribution device, while the second allows excellent distribution of water on small surfaces without external input of energy. In addition to being complex to integrate for water distribution over a large treatment area, the use of that tipping bucket leads to a significant drop of the hydraulic grade, increasing the necessary height of the treatment system.

In addition to not requiring as good a quality of distribution as the two approaches described above, certain applications limit the height of travel allowed by the dosing mechanism which needs to fit into tight spaces. The use of a pump is always possible, but this approach is expensive and requires an external source of energy. Other gravity dosing approaches without external energy input exist (Flout™, Septipak™, floating bucket flush, siphon, etc.), but they require space to operate which is not always available and remain unreliable at low stroke amplitude.

In France, gravity dosing devices are popular, and they are also used to a lesser extent in the United States. Dropping of the hydraulic grade when flowing through a treatment system is a major issue in on-site sanitation, as it often dictates the height of the system over the natural ground or the depth of the excavation required. There are therefore economic and aesthetic issues in using a device allowing a lower hydraulic grade drop.

As such, there is need to develop new approaches that would better meet the technological specifications of discharge systems and alleviate at least some of the disadvantages of existing devices.

SUMMARY

It has been shown herein that a device of the present application provides for the controlled discharge of liquid. The device of the present application further provides for a compact system occupying little surface, operating vertically and on a low clearance height. The device and method of the application allow to control the frequency, volume and flow rate of liquid discharged.

Accordingly, the present application provides a device for controlled discharge of liquid, comprising:

an elongated corrugated pipe having a bottom end and a top end configured to rest at a neutral point;

a floating plate connected to the top end of the corrugated pipe and having an opening at its center in fluid communication with the pipe and with a discharge port;

wherein the floating plate is configured to float on the surface of liquid, and the elongated corrugated pipe is configured to extend when a level of liquid rises up to a maximum extension point;

wherein at the maximum extension point of the pipe, the floating plate is configured to fill with liquid as liquid rises to allow for a return of the elongated corrugated pipe to the neutral point and discharge of liquid through the opening into the pipe towards the discharge port.

The present application further provides a device for controlled discharge of liquid, comprising:

an extendable pipe having a bottom end and a top end, said pipe being extendable from a collapsed position to an extended position;

a floating plate connected to the top end of the pipe and having an opening in fluid communication with the pipe and the bottom end for receiving and for discharging said liquid, a connecting portion of said pipe being configured to be connected to a discharge outlet of a reservoir;

wherein the floating plate is configured to float on the surface of said liquid, and the extendable pipe is configured to extend to said extended position when an increasing level of liquid forces said plate to rise up until said extended position is reached;

wherein at said extended position, the floating plate is configured to fill with liquid and collapse to reach said collapsed position whereat said liquid flows inside said pipe and through the bottom end for discharging said liquid.

Further provided is a device for controlled discharge of liquid, comprising:

a flexible extendable pipe having an inlet and an outlet, said pipe being extendable from a collapsed position to an extended position;

a floating plate adjacent to the outlet, said floating plate having an opening in fluid communication with the inlet and the outlet for receiving and discharging said liquid, a connecting portion of said pipe being configured to be connected to a discharge outlet of a reservoir;

wherein the floating plate is configured to float on the surface of said liquid, and the flexible extendable pipe is configured to extend to said extended position when an increasing level of liquid forces said plate to rise up until said extended position is reached;

wherein at said extended position, the floating plate is configured to fill with liquid and collapse to reach said collapsed position whereat said liquid flows through said inlet, inside said pipe and through the outlet for discharging said liquid.

Further included is a liquid distribution system comprising:

an enclosure comprising a liquid inlet and a liquid outlet; and a device for controlled discharge of the present application, connected at the bottom surface of the enclosure and the discharge port of the device is in fluid communication with the liquid outlet.

Also provided is a method for controlling discharge of a liquid, the method comprising: delivering the liquid to a device of the present application, until the pipe reaches the maximum extension point or extended position to discharge the liquid to the discharge port.

The present application further includes a method for improving distribution of water into a water treatment system, the method comprising: delivering water to a device of the present application, until the pipe reaches the maximum extension point or extended position to discharge the liquid to the discharge port towards the water treatment system.

Further provided is use of a device of the present application for controlling discharge of a liquid, or for controlling frequency, volume and flow rate of a liquid discharged, or for improving distribution of water into a water treatment system.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF DRAWINGS

The embodiments of the application will now be described in greater detail with reference to the attached drawings in which:

FIG. 4A: assembled with a device according to exemplary embodiments of the application, and FIG. 4B without the device.

FIG. 5A and FIG. 5B shows a device according to exemplary embodiments of the application, where the pipe segment is equipped with rings to restrict its extension: FIG. 5A in the restricted configuration, and FIG. 5B in the unrestricted configuration.

DETAILED DESCRIPTION

I. Definitions

Figures 1, 2:
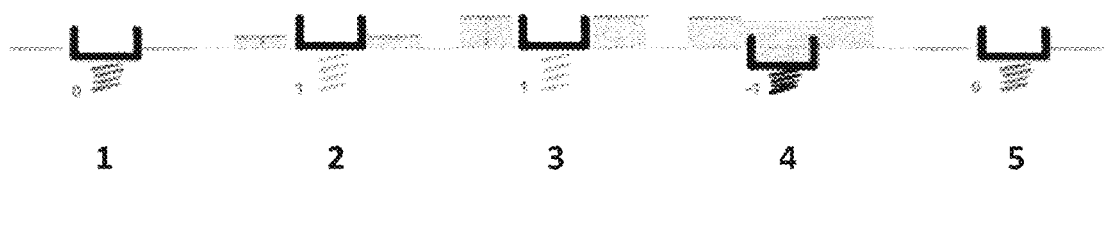
FIG. 1 shows the steps of the discharge when liquid level rises, according to exemplary embodiments of the application.
FIG. 2 shows a device according to exemplary embodiments of the application.

Unless otherwise indicated, the definitions and embodiments described in this and other sections are intended to be applicable to all embodiments and aspects of the present application herein described for which they are suitable as would be understood by a person skilled in the art.

As used in this application and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "consisting" and its derivatives as used herein are intended to be closed terms that specify the presence of the stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies or unless the context suggests otherwise to a person skilled in the art.

As used in the present application, the singular forms "a", "an" and "the" include plural references unless the content clearly dictates otherwise. For example, an embodiment including "a component" should be understood to present certain aspects with one component, or two or more additional components.

In embodiments comprising an "additional" or "second" component, such as an additional or second compound, the second component as used herein is chemically different from the other components or first component. A "third" component is different from the other, first, and second components, and further enumerated or "additional" components are similarly different.

The term "and/or" as used herein means that the listed items are present, or used, individually or in combination. In effect, this term means that "at least one of" or "one or more" of the listed items is used or present.

The term "suitable" as used herein means that the selection of the particular conditions or components would depend on the specific steps to be performed, and/or the specific use for the components, but the selection would be well within the skill of a person trained in the art.

As used herein, the term "water" can refer to various types of water. For example, the water can be rainwater, domestic wastewater, industrial wastewater, sewage or greywater. For example, the water can be intended to be discharged, for example towards a location or a treatment device.

II. Devices of the Application

It has been shown herein that a device of the present application provides for the controlled discharge of liquid. The device of the present application further provides for a compact system occupying little surface, operating vertically and on a low clearance height. The device and method of the application allow to control the frequency, volume and flow rate of liquid discharged.

For example, in the devices, systems, methods and uses of the present application, the liquid can be water.

According to some embodiments, the device is based on the use of a floating plate connected to the pipe by a corrugated, extendable and flexible pipe segment. In some embodiments, the plate is attached at its center to the pipe segment via an opening, which the pipe segment and the plate share. The position of the plate on the pipe allows it to remain upright, floating on the surface of the liquid, even when the liquid level is at its lowest. As the liquid rises, the plate rises by flotation to the maximum allowable extension of the corrugated segment. As the plate is at its maximum extension and the liquid level continues to rise, liquid reaches the edge of the plate, and then infiltrates the plate. If the rise of the liquid is fast enough, the amount of liquid falling into the plate is greater than that escaping from the central opening, leading to the filling of the plate. Without being bound to theory, the filling of the plate reduces the buoyancy force applied to the plate and the balance between the plate's buoyancy and the traction of the pipe segment is broken, resulting in a sudden descend of the plate and pipe segment, leading to a rapid evacuation of the layer of liquid found above the plate through the central opening of the device. This is illustrated in FIG. 1 showing the steps of the discharge when liquid level rises from 1) a neutral point, or non-extended pipe segment position, to 2) extension of the pipe segment as the plate floats on the surface of liquid, to 3) a maximum extension or fully extended position of the pipe segment, to 4) a sudden descent/collapse of the pipe segment with discharge of liquid, and finally 5) return to the neutral point.

FIG. 2 shows an exemplary device 200 of the present application, showing a floating plate 210 and a pipe segment 220. The central opening 230 is shown at the center of floating plate 210 and extends through the pipe segment 220. The floating plate 210 has a disc-shape and comprises an elevated sidewall 240 defining the circumference of the disc. In some embodiments, the sidewall may be slanted or tapered towards the top end, i.e. the upper portion is thinner and the lower portion is wider to form a slope directing the liquid within the floating plate. In some embodiments, the sidewall comprises an exterior wall and an interior wall and the interior wall is slanted towards the floating plate. In some embodiments, the tapering of the sidewall facilitates liquid to flow within the plate, as it decreases the surface tension of the liquid at the edge of the plate.

In some embodiments, the surface of the floating plate comprises a plurality of baffles. In FIG. 2, a central baffle, herein shown as a segmented protrusion 250 is provided around the opening 230, where spaces 260 between segments of protrusion 250 allow for a small discharge of liquid through the opening. In some embodiments, the surface of the floating plate 210 may comprises additional secondary baffles, herein shown as circular segmented protrusions 270 of a height that is smaller than the height of sidewall 240 to allow for regulating the flow of liquid towards the central opening. The baffles serve to refrain the liquid from getting quickly discharged through the central opening, thus forcing liquid to accumulate and fill the floating plate, especially at low flow rate, and thus reach the stress point when the equilibrium between the spring effect and the plate's buoyancy is broken creating the sudden descent/collapse of the pipe segment. In some embodiments, the plurality of baffles comprises a plurality of secondary baffles and wherein the height of the secondary baffles is less than height of the plate's elevated sidewall.

In some embodiments, the mobile device (plate and pipe segment) is made of a single piece, which is less expensive to manufacture and is also easy to maintain and replace in case of breakage. In some embodiments, the plate and the pipe segment are made of two separate assembled pieces. Without being bound to theory, making the plate and the pipe segment as two separate assembled pieces would allow to use material of different rigidity. In some embodiments, the pipe segment is made of a material selected from rubber (ex. silicon, EPDM) or thermoplastic elastomer, and the floating plate is made of the same material or of plastic such as polypropylene, polyethylene and polyvinylchloride. In some embodiments, the pipe segment is made of a material having a rigidity from about 15 to about 50 durometers, or about 18 to about 45 durometers, or about 30 to about 40 durometers. In some embodiments, the material further comprises an additive selected from antibacterial agent, antimicrobial agent, antifouling agent and mixtures thereof. In some embodiments, the plate is in a circular, ovoid, or polygonal shape and the selected shape would be within the purview of the skilled person in the art.

In some embodiments, the elevated sidewall of the floating plate has a height of about 5 mm to about 100 mm, measured from the bottom of the plate. In some embodiments, the central baffle or segmented protrusion at the central opening of the floating plate has a height of about 1 mm to about 100 mm. In some embodiments, the ratio of the height of the elevated sidewall to the height of the central baffle or segmented protrusion at the central opening is about 1 to about 100, or about 1 to about 50, or about 1 to about 10. In some embodiments, the height of the elevated sidewall and the height of the central baffle or segmented protrusion at the central opening may be modulated to allow for more or less liquid to be retained in the floating plate. In some embodiments, the secondary baffles have a height of about 0.25 mm to about 25 mm. In some embodiments, the ratio of the height of the central baffle to the height of the secondary baffles is about 1 to about 400, or about 10 to about 100, or about 10 to about 50, or about 5 to about 20.

In some embodiments, the central opening has a diameter of about 15 mm to about 100 mm. In some embodiments, the ratio between the height of the elevated sidewall and the diameter of the central opening is about 0.05 to about 20, or about 0.1 to about 10, or about 0.5 to about 5. In some embodiments, the floating plate has a diameter or cross-section of about 50 mm to about 250 mm, or about 100 mm to about 200 mm, or about 125 to about 175 mm. In some embodiments, the ratio of the diameter of the floating plate to the diameter of the central opening is about 1.25 to about 20, or about 1.5 to about 10, or about 2 to about 5.

In some embodiments, each section (or fold) of the pipe segment has a collapsed height of about 2 mm to about 25 mm. In some embodiments, each section (or fold) of the pipe segment has an extended height of about 10 mm to about 100 mm. In some embodiments, the pipe segment comprises from about 1 to about 9 sections or folds. In some embodiments, extension of the pipe segment is achieved through a telescopic configuration (i.e. comprising concentric sections designed to slide into one another), an accordion configuration (i.e. comprising a plurality of folds configured to fold/extend like an accordion), or the like.

In some embodiments, the maximum extension point/ extended position of the pipe segment may be adjusted by restraining its extension. For example, a ring may be added at a desired position along the pipe segment so that the extension of the pipe segment is restricted. In some embodiments, the ring may thus be inserted between a fold at a desired height along the pipe segment and fixed to another ring that is located between another fold, such that the folds therebetween will be refrained from extension. In some embodiments, the rings are complementary or attachable to each other, as shown in FIG. 5A (rings 500 and 500'attached together restricting the extension of the folds therebetween) and FIG. 5B (showing the two rings 500 and 500' unattached). In some embodiments, the ring is attached to the bottom of the reservoir and thus restrict extension of the folds therebetween. In some embodiments, the ring(s) will be made of a material more rigid than the pipe segment such that the extension of the pipe segment is properly restricted.

In some embodiments, the present application includes a liquid distribution system comprising: an enclosure comprising a liquid inlet and a liquid outlet; a device for controlled discharge of the present application connected at the bottom surface of the enclosure wherein the discharge port of the device is in fluid communication with the liquid outlet.

Figure 3:
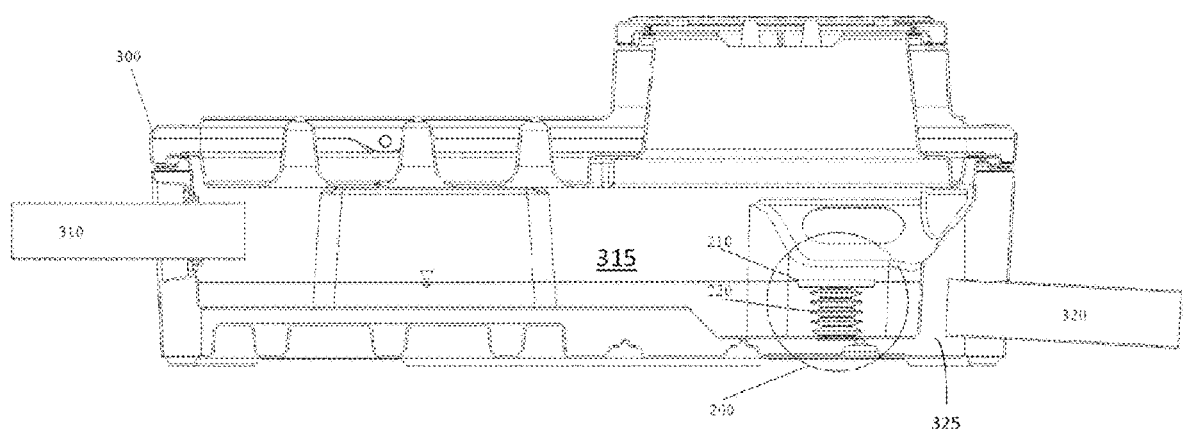
FIG. 3 shows a side view of an exemplary assembly comprising a device according to exemplary embodiments of the application.
Figure 4A:
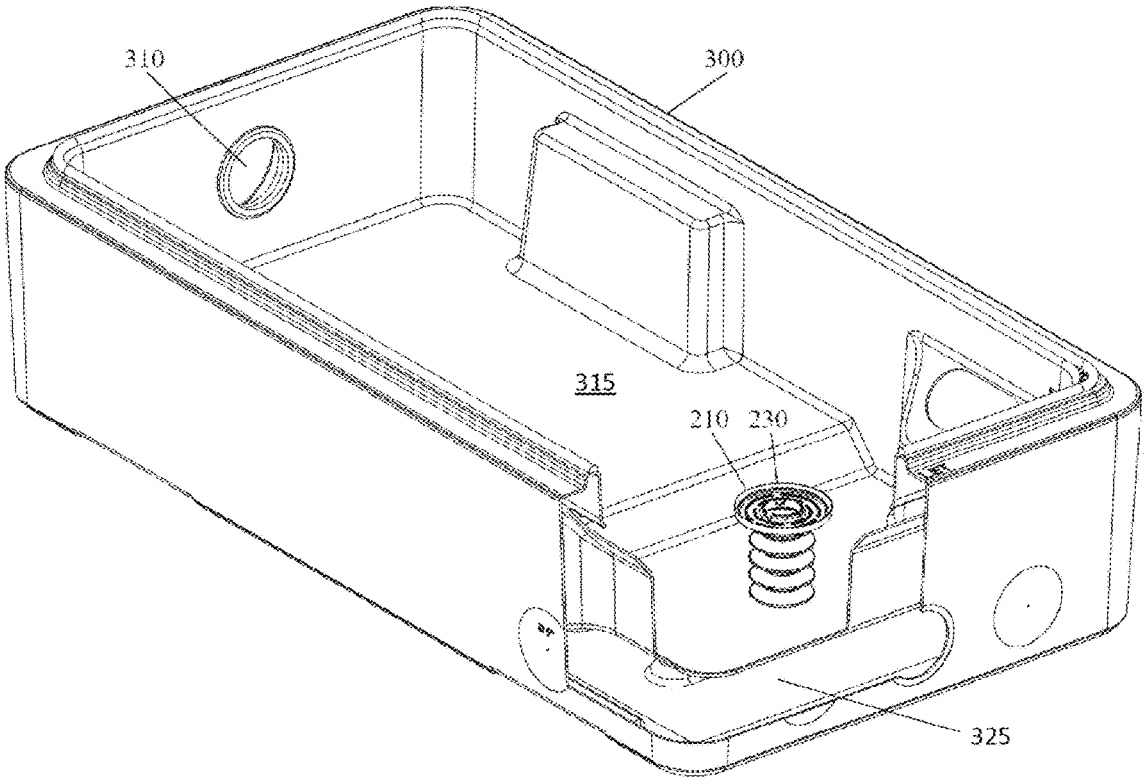
FIG. 4A and FIG. 4B shows a perspective view of an exemplary assembly comprising
Figure 4B:
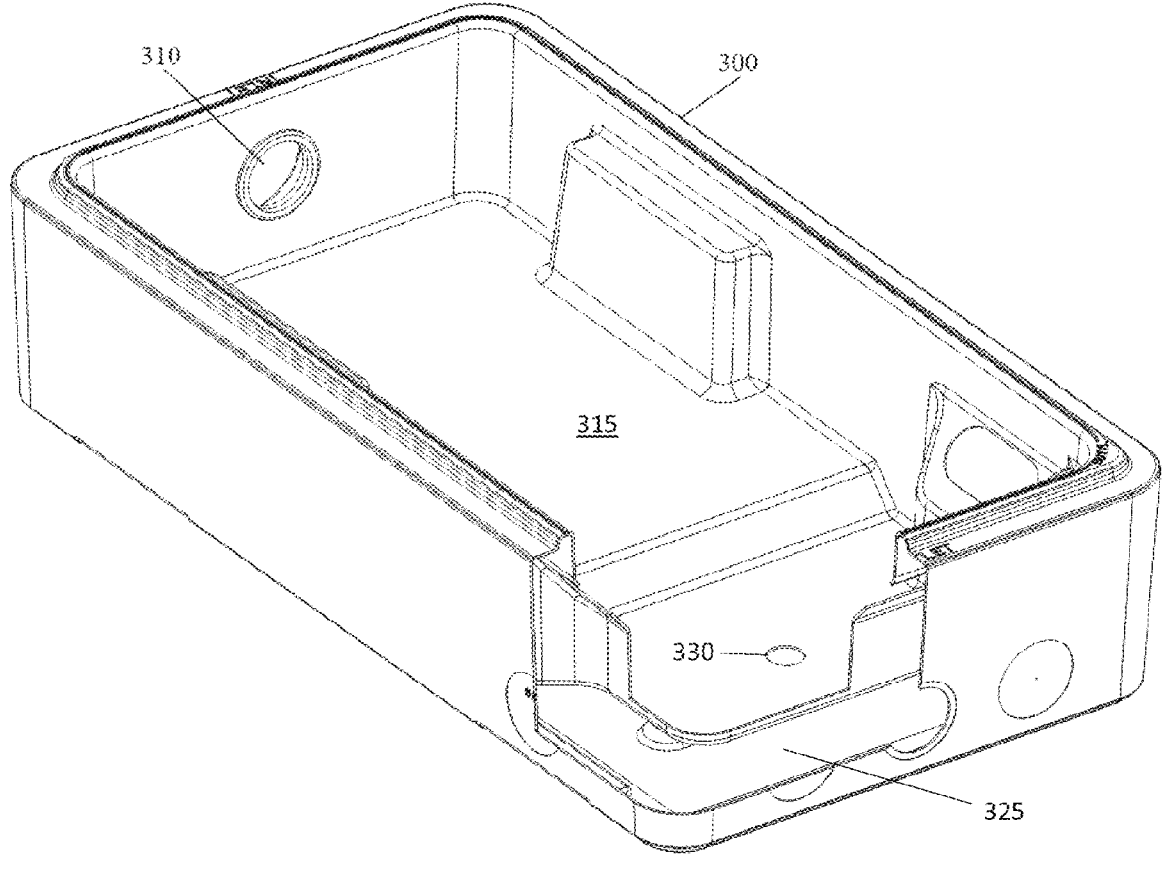

FIG. 3, and FIG. 4A show an exemplary device of the present application shown within an exemplary enclosure 300. Enclosure 300 comprises a water inlet 310 and water outlet 320. The enclosure also comprised an inner reservoir 315 connected to an outer reservoir 325 through a connection orifice 330 (shown on FIG. 4B). FIG. 4B illustrates the enclosure without the device assembled and thus shows the connection orifice 330 at the bottom of the inner reservoir 215 for connecting the device therein. The device 200 is connected to the bottom surface of the inner reservoir 315 of the enclosure 300 via the bottom end of the extendable pipe segment 220. When the water level reaches the maximum allowable extension of the extendable pipe (the stress point), the device 200 collapses allowing the water to transfer to the outer reservoir 325 through the central opening 230 of the device. Water then flows out of the outer reservoir 325 through one or more outlets 320 located on the outside walls of the enclosure.

Without being bound to theory, this type of device occupies little surface, operating vertically, and can work on a low clearance height depending on the characteristics and the material used for manufacture. This concept could allow the development of lower profile water treatment systems, which customers will be able to take advantage of, including less plastic required for the manufacture of certain tanks, mound of lower magnitude in the field, etc.

In some embodiments, the device of the present application may be used to control the frequency, volume and flow rate of water discharged into a water treatment system to improve its distribution, and therefore the quality of treatment. The device of the present application may also reduce the surface required for this type of system and allows working at a reduced height.

III. Uses and Methods of the Application

The present application includes a method for controlling discharge of a liquid, the method comprising: delivering the liquid to a device of the present application, until the pipe reaches the maximum extension point or extended position to discharge the liquid to the discharge port.

In some embodiments, controlling discharge of the liquid comprises controlling frequency, volume and flow rate of the liquid discharged.

Also included is a method for improving distribution of water into a water treatment system, the method comprising: delivering water to a device of the present application, until the pipe reaches the maximum extension point or extended position to discharge the liquid to the discharge port towards the water treatment system.

Use of a device of the present application for controlling discharge of a liquid is also included.

Further provided is use of a device of the present application for controlling frequency, volume and flow rate of a liquid discharged.

Also included is use of a device of the present application for improving distribution of water into a water treatment system.

EXAMPLES

Example 1

The embodiment shown on FIG. 2 was tested against simple gravity feeding for determining the distribution improvement within a standard perforated pipe. A 6-m long perforated pipe, having an inside diameter of 76 mm and which perforations pattern followed that described within the BNQ 3624-050 standard, was mounted to receive either the water dosed by the tested device of the present application or discharged from a calibrated flow rate water hose. The pipe was divided into 11 zones using 11 reservoirs disposed along the pipe that collected the water coming out of the perforations. The coefficient of variation was calculated for each distribution assay from the volume of water collected within these reservoirs, a lower value meaning a better distribution over the length of the pipe. Each assay was performed in duplicate to confirm the measurements.

The dosing device was a unitary piece composed of a 5-fold accordion-type pipe segment and a 13-mm sidewall plate of 140 mm in diameter, having a 50-mm circular central opening, and molded using a 40-durometer silicone rubber. Central baffle was 10-mm high while the secondary baffles' height was 0.33 mm. These specifications fixed a 110-mm high stroke for water accumulation and subsequent dosage. The device was integrated within an enclosure allowing a 15-L dose over a 110 mm-stroke. Water was slowly added to the enclosure until the device reached its maximum extension and collapsed.

The water hose flow rate was calibrated to discharge 2 or 10 liters per minute to test against representative flowrates encountered at the outlet of a septic tank under usual operation. Water was respectively discharged into the assembly for 7.5 minutes and 1.5 minute to provide a volume of 15 liters.

Gravity feeding led to coefficients of variance of 200% and 258% for 10 liters per minute and 2 liters per minute, respectively, whereas the tested dosing device ended up with a 148% coefficient of variation. That corresponds to a significant improvement, especially against low flow rate gravity feeding.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

9

10

The invention claimed is:

1. A device for controlled discharge of liquid, comprising:
an extendable pipe having a bottom end and a top end, said pipe being extendable from a collapsed position to an extended position;
a floating plate connected to the top end of the pipe and having an opening in fluid communication with the pipe and the bottom end for receiving and for discharging said liquid, a connecting portion of said pipe being configured to be connected to a discharge outlet of a reservoir;
wherein the floating plate is configured to float on the surface of said liquid, and the extendable pipe is configured to extend to said extended position when an increasing level of liquid forces said plate to rise up until said extended position is reached;
wherein at said extended position, the floating plate is configured to fill with liquid and collapse to reach said collapsed position whereat said liquid flows inside said pipe and through the bottom end for discharging said liquid.

2. The device of claim 1, wherein the extendable pipe is telescopic.

3. The device of claim 1, wherein the extendable pipe is accordion-type.

4. The device of claim 1, wherein said pipe and said plate are formed as two separate assembled pieces.

5. The device of claim 1, wherein said pipe and said plate are formed within a single unitary continuous piece.

6. The device of claim 1, wherein said pipe is made of a material comprising rubber or thermoplastic elastomer.

7. The device of claim 1, wherein said plate is made of a material comprising rubber, thermoplastic elastomer, polypropylene, polyethylene or polyvinylchloride.

8. The device of claim 1, wherein said pipe is made of a material having a rigidity of about 15 to about 50 durometers.

9. The device of claim 7, wherein said pipe is made of a material having a rigidity of about 18 to about 40 durometers.

10. The device of claim 1, wherein a receiving surface of the floating plate comprises a plurality of baffles configured for regulating the flow of liquid towards the opening.

11. The device of claim 10, wherein the plurality of baffles comprises a central baffle around the opening.

12. The device of claim 11, wherein the central baffle comprises segmented protrusions.

13. The device of claim 11, wherein the central baffle comprises segmented arc protrusions.

14. The device of claim 10, wherein the plurality of baffles comprises a plurality of secondary baffles.

15. The device of claim 1, wherein the floating plate comprises a sidewall configured for regulating the flow of liquid towards the opening.

16. The device of claim 11, wherein the floating plate is circular and comprises a sidewall disposed at the perimeter of the plate and the sidewall is configured for regulating the flow of liquid towards the opening, wherein the sidewall has a height that is greater than height of the central baffle.

17. The device of claim 16, wherein regulating the flow of liquid towards the opening comprises providing a flow of liquid delivered to said floating plate that is greater than the flow of liquid exiting the floating plate through the opening.

18. The device of claim 16, wherein the ratio height of the sidewall to the height of the central baffle is about 1 to 10.

19. The device of claim 17, wherein the sidewall is a slanted side wall having a bottom thickness that is greater than a top thickness.

20. The device of claim 19, wherein the slanted sidewall is configured for facilitating the liquid to flow within the floating plate.

* * * * *